United States Patent [19]

Külling

[11] 4,145,818
[45] Mar. 27, 1979

[54] METHOD AND APPARATUS FOR REMOVING A VAPORIZED LIQUID FROM A GAS, FOR USE IN E.G. A PROCESS BASED ON THE FLUIDIZED BED PRINCIPLE

[76] Inventor: Hanspeter Külling, Bruhlweg 59, CH-4132 Muttenz, Switzerland

[21] Appl. No.: 771,491

[22] Filed: Feb. 24, 1977

[30] Foreign Application Priority Data

Mar. 2, 1976 [CH] Switzerland ............... 2581/76

[51] Int. Cl.² ............................................ F26B 3/08
[52] U.S. Cl. ............................... 34/10; 34/27; 34/32; 34/57 A; 34/77
[58] Field of Search ............... 34/26, 27, 32, 77, 76, 34/78, 50, 10, 57 R, 57 A

[56] References Cited

U.S. PATENT DOCUMENTS

| | | | |
|---|---|---|---|
| 1,912,910 | 6/1933 | Neuman et al. | 34/10 |
| 2,064,084 | 12/1936 | Sando | 34/77 |
| 2,314,101 | 3/1943 | Phipps | 34/77 |
| 2,367,487 | 1/1945 | Desetti et al. | 34/77 |
| 2,460,546 | 2/1949 | Stephanoff | 34/57 A |
| 2,716,289 | 8/1955 | Lauck | 34/77 |
| 2,910,783 | 11/1959 | Hoyt | 34/77 |
| 3,186,106 | 6/1965 | Cobb et al. | 34/77 |
| 4,037,330 | 7/1977 | Kemmetmuller | 34/77 |

Primary Examiner—John J. Camby
Assistant Examiner—Larry I. Schwartz
Attorney, Agent, or Firm—Lada, Parry, Von Gehr, Goldsmith & Deschamps

[57] ABSTRACT

Air is passed through the product being processed, thus absorbing solvent. The air stream is then split into a main stream and a subsidiary stream. The main stream is heated by a heater. The subsidiary stream passes through a condenser which cools it, condensing out the solvent. The main and subsidiary streams are then combined and recycled to the product.

4 Claims, 1 Drawing Figure

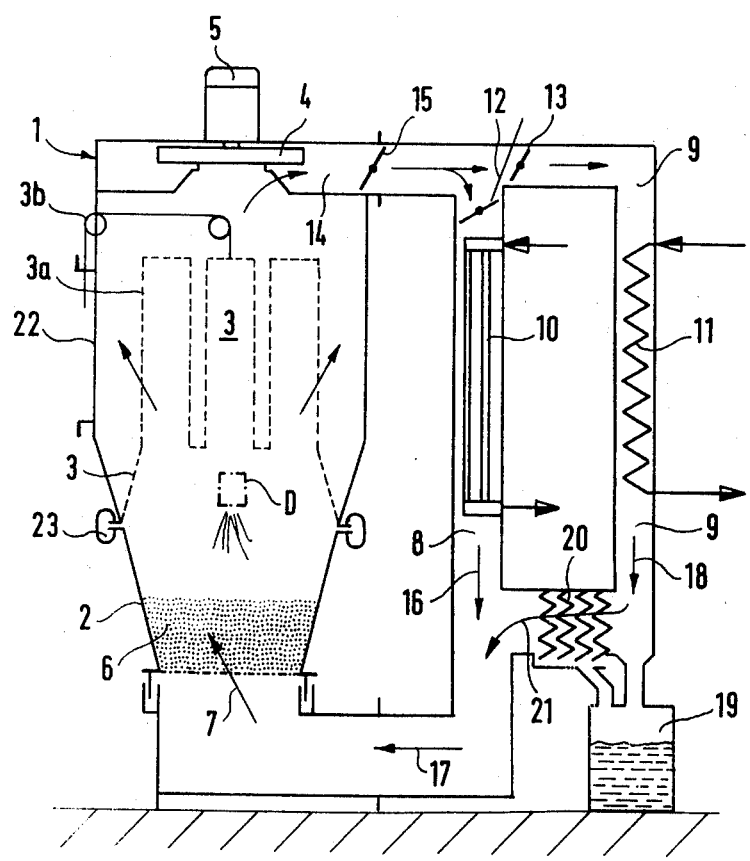

METHOD AND APPARATUS FOR REMOVING A VAPORIZED LIQUID FROM A GAS, FOR USE IN E.G. A PROCESS BASED ON THE FLUIDIZED BED PRINCIPLE

The present invention relates to a method for removing a vaporized liquid from a gas, in particular air. The method may, for instance, be used in a process based on the fluidized bed principle. A gas stream flows through or round the product being processed, thus absorbing said liquid, and is subsequently recycled through a closed system to the product.

The fluidized bed process has already been successfully used for spray granulating and film coating as well as for drying granulate materials. Known fluidized bed equipment suffers however from the significant disadvantage that the air which has passed through the product and become saturated with vapour (in particular solvent vapour) is then exhausted to the atmosphere. This not only pollutes the surrounding atmosphere but also means that the solvent cannot be recovered. In addition, the heat losses inherent in the equipment are considerable. It should also be added that valuable aroma substances also escape to the atmosphere with the exhaust gases.

Attempts have therefore been made to design equipment free of the abovementioned disadvantages, particularly equipment posing less of a pollution problem. In one of these known devices, a stream of air is passed through the product and the whole of this air stream is then passed through a condenser where the solvent is condensed out. From the condenser, the air is recycled to the apparatus, i.e. to the product being processed. Since, however, the whole of the circulating air must be cooled and reheated before it reaches the product again, such equipment — which normally has to be contructed from corrosion-resistant materials — is very costly. In addition, the energy consumption is disproportionately high.

Suggestions and attempts have also been made to burn the solvent contained in the air stream at 400° to 500° C. Apart from the fact that this method, too, causes a certain amount of pollution, such equipment is also very expensive. It is of course also impossible to recover the solvent.

Recovery equipment fitted with an adsorber has also not proved its worth owing to its high purchase price.

The object of the present invention is to provide an economical method which enables all the solvent to be recovered and which avoids both pollution of the environment and loss of valuable aroma substances.

This is achieved by the method of the invention by arranging that during at least part of the processing period at least a partial gas stream is split off from the circulating gas and passed through a condenser where it is cooled to an extent such that at least a part of the vaporized liquid present in the partial gas stream is condensed, the partial gas stream then being fed back into the remainder of the gas stream and the combined gas stream thus formed recycled to the product.

The gas stream is conveniently split into a main gas stream and a partial gas stream amounting to a fraction of the main gas stream, the partial gas stream being passed through a bypass duct connected in parallel with the main gas stream.

The bypass duct is preferably not opened until after a certain starting or warming-up period, but remains open continuously during subsequent operation.

The bypass duct may be opened or closed as a funtion of the degree of saturation of the circulating gas.

The accompanying drawing depicts an illustrative embodiment of the invention.

The single FIGURE of the drawing shows schematically a vertical section through a pressure surge resistant fluidized bed dryer including a facility for solvent recovery.

Although the embodiment described below is a drier, it should be expressly pointed out that the idea of the invention may be applied in the same manner to other equipment working on the fluidized bed principle, e.g. fluidized bed spray granulators and fluidized bed film coaters.

The dryer of the invention has a housing 1, the lower part of which is designed as a material container 2. Inside the housing is an air filter 3, the filter bags 3a of which can be removed in the usual way for cleaning by means of a lifting mechanism 3b. Mounted in the upper part of the housing 1 is a fan 4 driven by an external motor 5 standing on the housing. The container 2 holds the product 6 to be dried, e.g. a foodstuff in granular form or a granular pharmaceutical. When the drier is operating, the fan 4 sucks pre-heated air through the product in the direction of arrow 7. The air thus removes the moisture from the product, giving a dry material.

In the drier shown in the FIGURE, the stream of air carrying solvent and aroma substance vapours is not discharged to the atmosphere after passing through the filter 3 but recycled through a return duct to the container 2. The air thus circulates in a closed system and the valuable aroma substances swept out of the product being dried are not lost.

Since the air passing through the product 6 continually absorbs moisture (e.g. solvent), there must be a facility within the closed cycle for removing this moisture continuously, consuming very little energy in the process.

This is achieved by connecting a bypass duct 9 in parallel with the return duct 8. The return duct 8 is provided with an air heater 10, the bypass duct 9 with a condenser 11. Positioned at the inlets to the two ducts 8 and 9 are control flaps 12 and 13 enabling the flow of air through the passage 14, regulatable by means of a flap 15, to be split as required between the two ducts 8 and 9.

The air flowing through the return duct 8, which normally carries by far the larger fraction of the total air flow, is heated to the desired drying temperature by the air heater 10 and passes along the route indicated by arrows 16, 17 and 7 to the product 6 again. This air thus only absorbs heat in the return duct 8.

The air flowing through the bypass duct, which normally carries only a fraction of the total air flow, is cooled by the condenser 11 to such an extent that the solvent vapour it has brought over is condensed and runs in the direction of arrow 8 into a receiver 19. Any small droplets of condensate swept on by the current of air are retained by a droplet catcher 20 through which the air from the bypass duct 9 passes in the direction of arrow 21. Shortly after emerging from the droplet catcher 20, the stream of cooled air from duct 9 joins the stream of heated air from duct 8. The two streams mix and are further circulated by the fan.

The air heater 10 may for instance be steam heated. A freon, brine or water may be used as the coolant for the cooler 11.

Before starting up the dryer, the product 6 to be dried is placed in the container 2. The container is then hermetically sealed onto the housing 1. The fan 4 provides the air circulation necessary to keep the product 6 in the required state of turbulence.

The filter 3 positioned above the product prevents even the finest product particles from being carried over. Since this filter has no direct bearing on the present invention, it will not be described.

While the total air flow rate is regulated by means of flap 15, the relative flow rates in the two parallel ducts 8 and 9 is controlled by flaps 12 and 13. In general, the apparatus is started up by first running for a few minutes without cooling, i.e. with flap 13 closed so that all the air flows during this short warming-up period through duct 8 only. As soon as the moisture content of the air has reached a certain level, however, flap 13 is opened to the required extent. Flap 13 may also be controlled by a thermostat responding to changes in the air temperature.

The purpose of the air heater 10 is merely to supply the latent heat of evaporation of the solvent and the energy required to heat up the product, as well as replacing the relatively low amount of heat lost by conduction. The condenser 11 serves to cool the gas flowing through duct 9 to an extent such that at least part of the moisture present in the gas as a result of the passage of the gas through the product 6 is condensed out and collected in the receiver 19.

To protect the apparatus from the affects of an explosion, a pressure relief device (explosion door) 22 is provided in the housing 1. The whole of the housing, including the passages and ducts illustrated in the FIGURE, is constructed so as to be resistant to pressure surges. In addition, safety clamps 23 are provided on the housing which prevent the material container 2 from being forced downwards in the event of an explosion and flames escaping from the housing.

The novel drying method of the invention offers important advantages over prior art processes.

The recovery of the solvent represents a double advantage. Firstly, pollution of the environment is avoided and, secondly, the relatively costly solvent is made available for further use.

On passing through the product 6, the hot air also of course sweeps out the valuable aromatic substances which are generally lost with prior art apparatuses. With the apparatus of the invention, these aromatic substances remain in the gas stream and are recycled with the gas, thus coming repeatedly into contact with the product 6. The quality of the final product is therefore much improved.

Since the humidity of the surrounding air and the resistance of the filter have no influence on the functioning of the apparatus of the invention, the moisture content of the end product is uniformly distributed throughout the end product. The apparatus can, for instance, be operated until the physical properties (moisture content and temperature) of the air flowing through the bypass duct 9 are at least approximately the same as those of the air passing through duct 8.

The apparatus can of course be operated in many ways by one skilled in the art. Flap 13 could, for example, be left open after the warming-up period mentioned above. It would also be possible for this flap to be controlled as a function of certain operational parameters, so that the gas flow through duct 9 varies as a function of these parameters. In particular, flap 13 could be opened or closed further as a function of the degree of saturation of the circulating gas.

The apparatus of the invention is relatively cheap in comparison with the prior art recovery devices already mentioned. Since the heat input required is merely the sum of the latent heat of vapourization of the solvent, the heat losses and the energy necessary to heat up the product, the energy consumption is also relatively low.

The mode of operation of the apparatus of the invention will now be further explained by means of an example.

100 kg of a pharmaceutical product containing 15% of solvent is placed in the container 2. The total amount of solvent present in the pharmaceutical product is therefore 15 kg. The aim is to dry the granulate pharmaceutical product by the fluidized bed process.

After introducing the product, the fan 4 and the air heater 10 are switched on, flap 13 remaining closed. During a warming-up period of two to three minutes, air is circulated through duct 8 and the housing 1 until it has reached a certain degree of saturation. On passing through the moist product 6, the air sweeps out the solvent vapour. As soon as the predetermined degree of saturation is reached, flap 13 is opened to an extent such that about 10% of the total air flow passes through the condenser 11. If, for instance, the total air circulation is about 6,000 m$^3$ per hour at a drying temperature of about 70° C., then about 600 m$^3$ of air flow through the condenser per hour, this air being cooled down by the condenser to e.g. 10° C. The solvent is thus condensed out and runs down into the receiver 19. The small droplets held back by the droplet catcher 20 likewise flow into the receiver 19.

The air which has been cooled down to 10° C. then mixes with the heated air from duct 8 and the mixed air stream then passed in the direction of arrows 17 and 7 through the product.

As the drying process proceeds, the moisture content of the air naturally decreases as the moisture contained in the air is continuously condensed out by the condenser 11 and the product becomes drier. Towards the end of the process, therefore, the degree of saturation of the circulating air falls below the pre-determined level. This is allowed for in the apparatus of the invention, in contrast to prior art devices of this kind, by the fact that only a proportion of the total air in circulation is cooled. In the final phase of the drying process, the air circulating in the apparatus of the invention thus no longer takes up any moisture and has a quite definite moisture content. A further significant advantage of the process of the invention is therefore that the processed product has a uniformly distributed final moisture content.

If the method of the invention is to be used for spray granulating, the solvent is sprayed onto the agitated product through a spray nozzle D (indicated by dot-and-dash lines) mounted within the housing. When the novel method is employed for film coating, the product 6 consists of tablets onto which a lacquer containing a solvent is sprayed. On completion of the film coating process, the tablets are uniformly coated with a layer of lacquer, while the solvent can be removed from the collector 19 and re-used.

It is well known to those skilled in the art that the operation of this kind of apparatus gives with certain solvent vapours a so-called hybrid mixture which on occurrence of a spark can under certain conditions lead to an explosion. Research has revealed that if sufficiently large pressure relief openings 22 are provided the pressure within the apparatus produced by an explosion can be reduced by such an extent that no undesirable effects whatever result.

As experiments have shown, the heater 10 may also be positioned not in duct 8 but in the passage indicated by arrow 18, e.g. adjacent to the droplet catcher 20.

To prevent the vapours circulating within the apparatus from condensing on the walls of the apparatus, the whole apparatus — with the exception of the side duct containing the condenser — is surrounded by an insulating casing.

The apparatus of the invention is cheap to buy, involves low maintainance costs, recovers the solvent and is extremely efficient. In addition, it gives rise to only negligible amounts of pollutants. Irrespective of the conditions of the surroundings, the final product of the process has a uniformly distributed moisture content.

What is claimed is:

1. A method of treating a granular material, wherein a stream of gas is passed in a closed circuit upwardly through the granular material thereby to fluidize the granular material and to take up as vapor liquid that was present in the granular material, the stream of gas, having the vaporized liquid entrained therein, is then split into first and second partial streams, the first partial stream is cooled by condensing means whereby vaporized liquid present in the first partial stream is condensed therefrom whereas said second partial stream bypasses said condensing means, the first partial stream is recombined with the second partial stream, and the resulting stream is again passed upwardly through the granular material.

2. A method as claimed in claim 1, wherein the first partial stream is passed through a droplet catcher after having been cooled and before recombination with the second partial stream.

3. A method as claimed in claim 1, wherein the second partial stream is heated.

4. A method of treating a granular material, wherein a stream of gas is passed in a closed circuit upwardly through the granular material thereby to fluidize the granular material and to take up as vapor liquid that was present in the granular material, the stream of gas, having the vaporized liquid entrained therein, is heated and is again passed upwardly through the granular material, and after an initial warm-up period the stream of gas leaving the granular material and having vaporized liquid entrained therein is split into first and second partial streams, the first partial stream is cooled by condensing means whereby vaporized liquid present in the first partial stream is condensed therefrom whereas said second partial stream bypasses said condensing means, the second partial stream is heated, the first and second partial streams are recombined, and the resulting stream is again passed upwardly through the granular material.

* * * * *